3,782,924
FINE-GRAINED ZIRCONIUM-BASE MATERIAL
George Robert Van Houten, Cincinnati, Ohio, assignor to the United States of America as represented by the United States Atomic Energy Commission
No Drawing. Filed Nov. 26, 1962, Ser. No. 240,187
Int. Cl. C22c 15/00
U.S. Cl. 75—122.5                    19 Claims

ABSTRACT OF THE DISCLOSURE

A method of making zirconium with inhibited grain growth characteristics, by the process of vacuum melting the zirconium, adding 0.3 to 0.5% carbon, stirring, homogenizing and cooling.

---

This invention deals with zirconium-base materials of improved physical characteristics, and in particular with zirconium-base materials that have a very fine grain size. By the term "zirconium-base materials," zirconium metal, zirconium-base alloys, and in particular zirconium-uranium alloys containing from 2 to 10 weight percent of uranium, are intended; the term is also to include hydrides of such materials.

The zirconium-base materials just described are used, for instance, as moderators in nuclear reactors or, if uranium-containing, as fuel or fuel-moderator combinations in nuclear reactors. A zirconium hydride-uranium mixture, for instance, is a good fuel-moderator material.

It is an object of this invention to provide a zirconium hydride material which has a high hydrogen density.

It is still another object of this invention to provide a zirconium-base material which is radiation-stable at ambient and elevated temperatures and also at temperature variations, the so-called thermocycling, usually between about 250 and 650° C. as it occurs in nuclear reactors.

It is a further object of this invention to provide a zirconium hydride material that is stable at elevated temperature for a reasonable length of time and which, for instance, at about 700° C. retains its hydrogen content to at least 90%.

It is finally an object of this invention to provide a zirconium-base material that is characterized by an unusually fine grain size and a high modulus of rupture.

It has been found that carbon, when added to the zirconium-base material in a small amount, inhibits grain growth that otherwise would take place during fabrication and during use of the articles made of such materials. This beneficial effect applies to both zirconium metal materials and to the hydrided material at temperatures up to about 1200° C.

The process of this invention thus comprises vacuum-melting zirconium-base material, incorporating carbon in the material in a quantity of between 0.1 and 1.0% by weight, stirring the mixture for homogenization and cooling the mass. The grain refinement by the carbon addition was found to be so radical that it could be detected with the unaided eye. After subsequent hydriding the hydrided material so produced showed a hydrogen density related to the process cycle but typically about 6 to 6.7×10$^{22}$ atoms of hydrogen per cm.$^3$ of material.

The zirconium-base material can be subjected to a pretreatment step in order to start out with a relatively fine-grained material. Such treatment may comprise warm or cold-working followed by annealing at from 750° to 800° C. for about 30 minutes. Metallic or hydrided zirconium-base material can be used.

The carbon can be added either as graphite or as zirconium carbide. The latter is preferred, because then no unreacted graphite remains in the material.

Incorporation of the zirconium carbide or graphite has been carried out by arc-melting, by hot-pressing under vacuum and by induction-melting. Induction-melting was found to be incomparably better, most certainly on account of the stirring effect which the induction coil has.

If the zirconium carbide or graphite is added prior to hydriding, hydriding may be carried out immediately thereafter. Various processes of hydriding are known to those skilled in the art and need not be described here; this phase is not being claimed per se as an inventive feature.

The grain size of some of the materials treated by the process of this invention can still be refined furthermore by warm-working, for instance by a combination of forging and rolling at temperatures of at least 780° C. The zirconium-base material made by the process of this invention can be used as is as fuel, moderator or a combination of the two in nuclear reactors provided the temperature in the reactor does not exceed 540° C. and the materials are not to be held in the reactor for more than about 1000 hours. If the reactor temperature is higher, say above 675° C., and the resident time in the reactor exceeds about 1000 hours, it is necessary that the products or the elements made therefrom be coated or clad by materials and methods known to those skilled in the art.

It will be understood that the invention is not to be limited to the details given herein but that it may be modified within the scope of the appended claims.

What is claimed is:

1. A process of inhibiting grain growth in zirconium-base materials selected from the group consisting of zirconium metal, zirconium-base alloys, zirconium hydride and hydride zirconium-base alloys, comprising vacuum-melting said zirconium-base material, adding from 0.3 to 0.5% by weight of carbon, stirring the mixture for homogenization and cooling the material for solidification.

2. A process of inhibiting grain growth in zirconium-base materials selected from the group consisting of zirconium metal, zirconium-base alloys, zirconium hydried and hydride zirconium-base alloys, comprising vacuum-melting said zirconium-base material, adding from 0.1 to 0.3% by weight of carbon, stirring the mixture for homogenization and cooling the material for solidification.

3. A process of inhibiting grain growth in zirconium-base materials selected from the group consisting of zirconium metal, zirconium-base alloys, zirconium hydride and hydride zirconium-base alloys, comprising vacuum-melting said zirconium-base material, adding from 0.5 to 1.0% by weight of carbon, stirring the mixture for homogenization and cooling the material for solidification.

4. The process of claim 1 wherein the zirconium-base material is a zirconium-uranium alloy in which the uranium content ranges between 2 and 10% by weight.

5. The process of claim 1 wherein the zirconium-base material is a uranium-containing zirconium hydride.

6. The process of claim 1 wherein the carbon is added in the form of graphite.

7. The process of claim 1 wherein the carbon is added in the form of zirconium carbide.

8. The process of claim 1 wherein stirring is carried out by melting the zirconium-base material in an induction furnace.

9. The process of claim 1 wherein the solidified material is warm-worked at a temperature of at least 780° C.

10. The process of claim 1 wherein the solidified material is warm worked and then heat treated at 750–800° C.

11. The process of claim 1 wherein the solidified material is cold-worked and then heat treated at 750–800° C.

12. A process of inhibiting the grain growth in a zirconium hydride containing uranium, comprising vacuum-melting the hydride mixture in an induction furnace, adding about 0.5% by weight of zirconium carbide, cooling the material for solidification and forging and rolling it at a temperature of about 800° C.

13. As a new composition of matter, a zirconium-uranium alloy consisting of from 2 to 10% by weight of uranium and from 0.3 to 0.5% by weight of carbon as zirconium carbide.

14. As a new composition of matter, a zirconium-uranium alloy consisting of from 2 to 10% by weight of uranium and from 0.1 to 0.3% by weight of carbon is zirconium carbide.

15. As a new composition of matter, a zirconium-uranium alloy consisting of from 2 to 10% by weight of uranium and from 0.5 to 1.0% by weight of carbon is zirconium carbide.

16. As a new composition of matter, a zirconium hydride consisting of from 2 to 10% by weight of uranium and from 0.3 to 0.5% of zirconium carbide.

17. As a new composition of matter, a zirconium hydride consisting of from 2 to 10% by weight of uranium and from 0.1 to 0.3% of zirconium carbide.

18. As a new composition of matter, a zirconium hydride consisting of from 2 to 10% by weight of uranium and from 0.5 to 1.0% of zirconium carbide.

19. A process of inhibiting grain growth in zirconium hydride material selected from the group consisting of zirconium hydride and hydrided zirconium-base alloys, comprising vacuum-melting zirconium material selected from the group consisting of zirconium metal and zirconium-base alloys, adding from 0.1 to 1% by weight of carbon, stirring the mixture for homogenization, cooling the mixture for solidification, and hydriding the mixture.

References Cited
UNITED STATES PATENTS 2,929,707   3/1960   Weeks et al. ............ 75—211
3,070,526   12/1962  Marten .............. 432—645

CARL D. QUARFORTH, Primary Examiner

B. HUNT, Assistant Examiner

U.S. Cl. X.R.

75—177